United States Patent
Holmes

(10) Patent No.: US 7,591,748 B2
(45) Date of Patent: Sep. 22, 2009

(54) ELECTRICALLY VARIABLE TRANSMISSION WITH A COMPOUND MOTOR/GENERATOR

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 405 days.

(21) Appl. No.: 11/467,981

(22) Filed: Aug. 29, 2006

(65) Prior Publication Data
US 2008/0058145 A1 Mar. 6, 2008

(51) Int. Cl.
*F16H 3/72* (2006.01)
(52) U.S. Cl. .......................... 475/5; 475/149; 903/906; 903/910
(58) Field of Classification Search .............. 475/5, 475/149, 151; 477/3; 903/903, 906, 910, 903/911, 951
See application file for complete search history.

(56) References Cited

U.S. PATENT DOCUMENTS 6,072,287 A 6/2000 Gataric
6,429,562 B2 8/2002 Nakano et al.
6,751,960 B2 6/2004 Arimitsu et al.
2006/0063629 A1 * 3/2006 Minagawa et al. ............. 475/5
2006/0249319 A1 * 11/2006 Hoare et al. ............... 180/65.4

* cited by examiner

*Primary Examiner*—Sherry L Estremsky
*Assistant Examiner*—Edwin A. Young

(57) ABSTRACT

An electrically variable transmission has a differential gear set with first, second and third members operatively connected between an input member and an output member. The input member is also operatively connected to an engine for receiving power from the engine. The transmission also includes a compound motor/generator that has a single stator and at least two rotors, referred to herein as first and second rotors. The single stator is operable to provide power to, receive power from and transfer power between the two rotors. The rotors are each operatively connected to a different respective member of the differential gear set. The transmission has a mechanical power path and an electromechanical power path. In some embodiments, selectively engagable torque-transmitting mechanisms are positioned to allow various modes of electrically variable power flow. Input-split and compound-split embodiments are presented. Embodiments having coaxial rotors and embodiments having axially-adjacent, axially aligned rotors are presented.

17 Claims, 4 Drawing Sheets

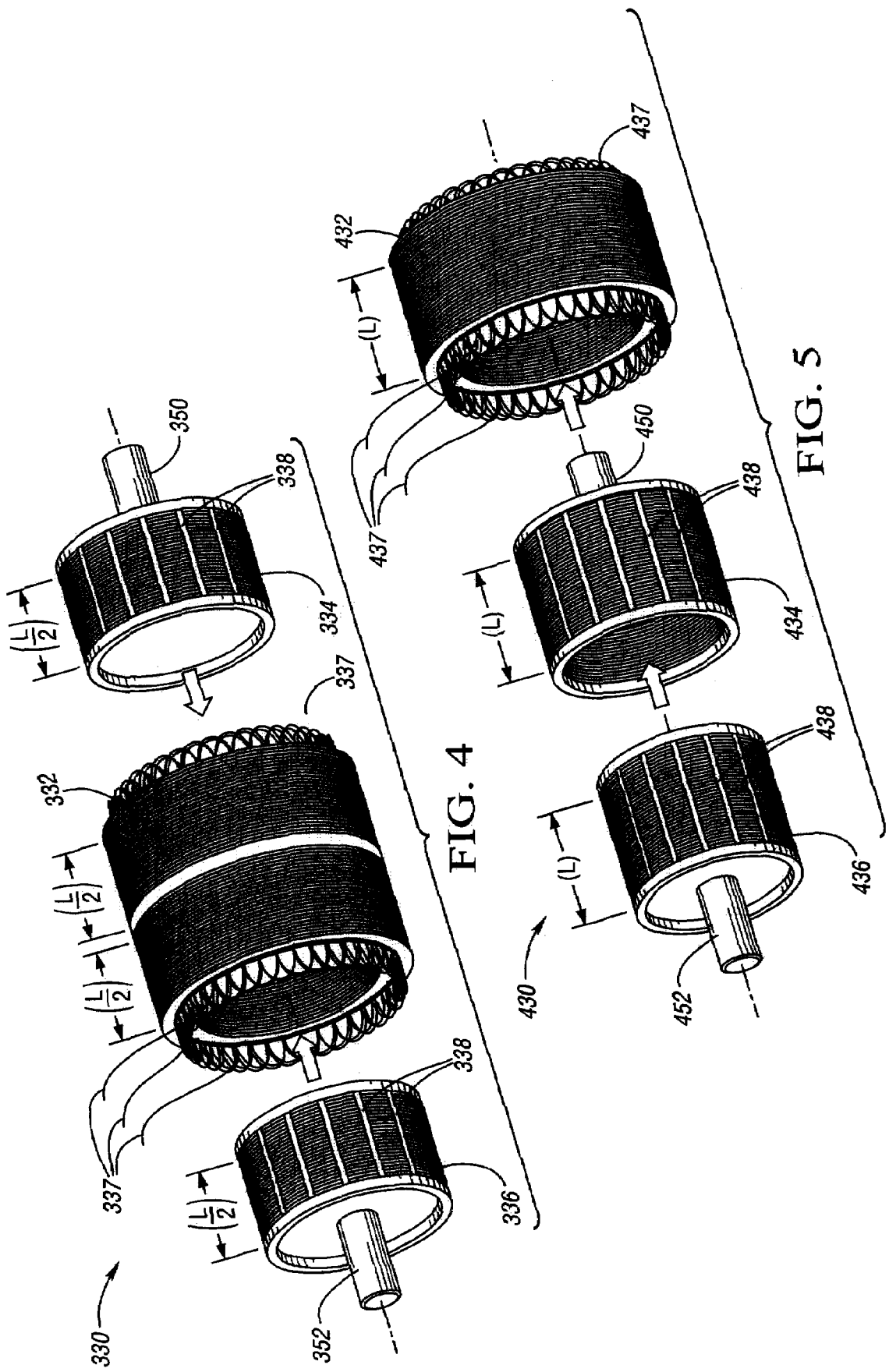

ELECTRICALLY VARIABLE TRANSMISSION WITH A COMPOUND MOTOR/GENERATOR

TECHNICAL FIELD

The invention relates to a transmission having a compound motor/generator.

BACKGROUND OF THE INVENTION

Hybrid electrically variable powertrains include an engine and a transmission which receives power flow from the engine and from one or more motor/generators. Hybrid electrically variable transmissions have a differential gear set, with power from the engine and power from the motor/generator flowing through different members of the differential gear set. Hybrid electrically variable transmissions may include torque-transmitting mechanisms controllable in various engagement schemes to offer a combination of operating modes, including both electrically variable ranges and fixed gear ratios. The electrically variable ranges typically provide smooth operation while the fixed gear ratios provide maximum torque performance and maximum fuel economy under certain conditions such as continuous highway cruising. The electrically variable range is established via an electromechanical power path, wherein a fraction of the power transmitted from the engine to the output is converted into electricity by one motor/generator then back into mechanical power by another motor/generator. Fixed gear ratios typically provide excellent transmission output torque and vehicle acceleration by coupling the motor/generators and the engine directly together. In a fixed gear ratio, the power flow path from the transmission input member to the transmission output member is considered to be entirely through a mechanical power path, as speed is not varied by the motor/generator.

SUMMARY OF THE INVENTION

An electrically variable transmission has a differential gear set with first, second and third members operatively connected between an input member and an output member. The input member is also operatively connected to an engine for receiving power from the engine. The transmission also includes a compound motor/generator that has a single stator and at least two rotors, referred to herein as first and second rotors. The single stator is operable to provide power to, receive power from and transfer power between the two rotors. The first and second rotors are each operatively connected to a different respective member of the differential gear set. The transmission has a mechanical power path and an electromagnetic power path. In some embodiments, selectively engagable torque-transmitting mechanisms are positioned to allow various modes of electrically variable power flow. Input-split and compound-split embodiments are described herein, although the invention is not limited to embodiments having such types of power flow. Embodiments having coaxial rotors and embodiments having axially-adjacent, axially aligned rotors are presented.

By providing a compound motor/generator, a direct power path from one rotor to the other rotor through the common stator is available that avoids the inherent losses associated with using two separate motors to accomplish rotor to rotor power transfer (i.e., transferring mechanical power from a first rotor to electrical power in the windings of a first stator, transmitting this electrical power to the windings of a second stator and then transferring the electrical power from the second stator to the second rotor.) Embodiments having coaxial rotors (i.e., concentric rotors) may present a compact, space efficient option as electromagnetic power can be transmitted from one rotor to the other without the need for both rotors to be adjacent to a stationary member (i.e., to the stator).

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is an exploded perspective view of a compound motor/generator having adjacent, axially-spaced, axially-aligned rotors that are driven by common windings in the stator, for use in any of the embodiments of the transmissions of FIGS. 1 through 3;

FIG. 5 is an exploded perspective view of a compound motor/generator having coaxial rotors that share a common flux path with a common stator for use in any of the embodiments of the transmissions of FIGS. 1 through 3;

DESCRIPTION OF THE PREFERRED EMBODIMENTS

Figure 1:
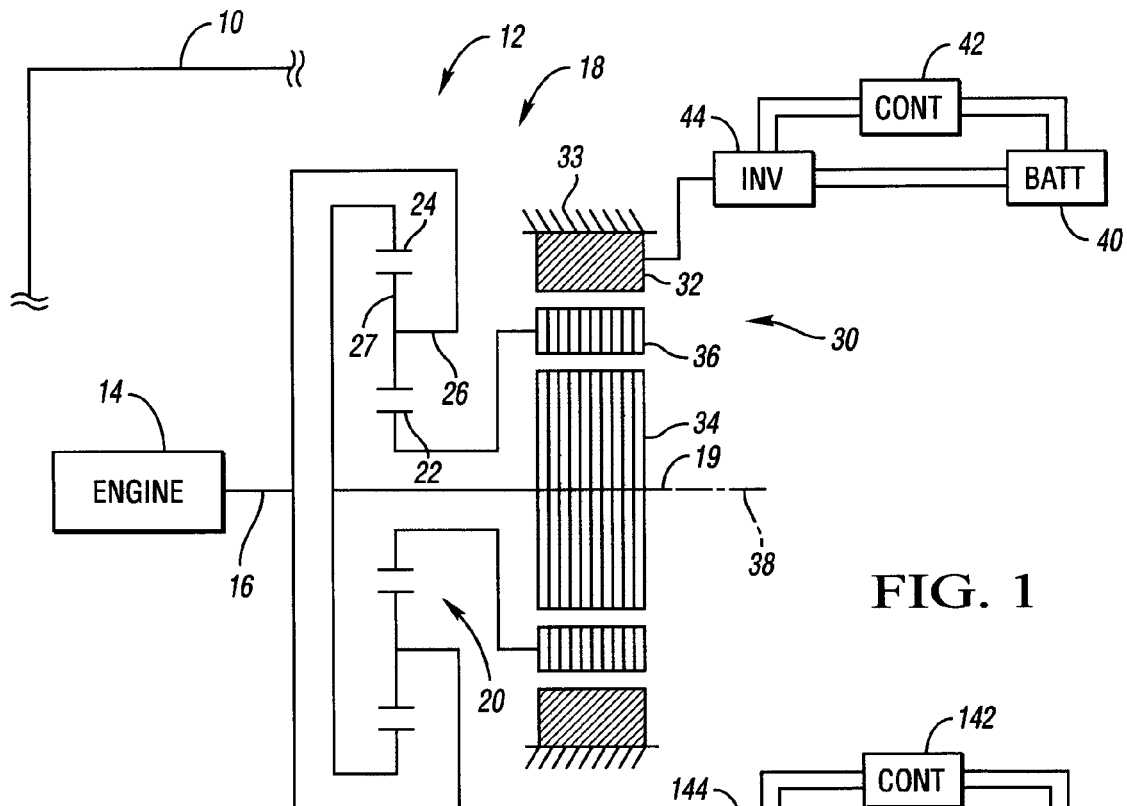
FIG. 1 is a schematic illustration of an embodiment of a vehicle having a powertrain with an electrically variable transmission including a compound motor/generator with coaxial rotors and a differential gear set.

Referring to the drawings, wherein like reference numbers refer to like components, one representative form of an electrically variable transmission having a compound motor/generator is depicted in FIG. 1. The vehicle 10 utilizes a powertrain 12 having an engine 14 with an engine output member that directly drives an input member 16 of a transmission 18. The input member 16 may be in the nature of a shaft. A transmission output member 19, which may also be in the nature of a shaft, is operatively connected to vehicle wheels (not shown) such that the powertrain 12 drives the wheels. Optionally, a transient torque damper may be incorporated between the engine 14 and the input member 16, although this is not required. Additionally, a torque-transmitting mechanism may optionally be placed between the engine 14 and the input member 16 to permit selective engagement of the engine 14 with the transmission 18. In the embodiment depicted, the engine 14 may be a diesel engine or other internal combustion engine.

The transmission 18 includes a differential gear set 20 that in this embodiment is a planetary gear set having a sun gear member 22, a ring gear member 24, and carrier member 26 that rotatably supports a plurality of pinion gears 27 that intermesh with both the sun gear member 22 and the ring gear member 24. The input member 16 is continuously connected with the carrier member 26 and the ring gear member 24 is continuously connected with the output member 19. Although the differential gear set is a planetary gear set, other types of differential gear sets, such as beveled gears, may be used within the scope of the invention.

The transmission 18 further includes a compound electromagnetic motor/generator 30. The compound motor/generator 30 includes a single stator 32 rigidly connected with a stationary member 33 such as the transmission housing. The single stator 32 is controllable to receive power from, provide power to and transfer power between a first rotor 34 and a second rotor 36. The first and second rotors 34, 36 are coaxially aligned and are annular in nature, concentrically placed about an axis of rotation 38 that is also the axis of rotation of the output member 19.

In addition to receiving power from the engine 14, an energy storage device such as a battery 40 selectively seeks power from or provides power to the compound electromagnetic motor/generator 30 under the control of a controller 42. The controller 42 is in signal communication with the battery 40 and in signal communication with the power inverter 44. The controller 42 responds to a variety of input signals including vehicle speed, operator command, the level to which the battery 40 is charged and the power being applied by the engine 14, to regulate the flow of power between the battery 40 and the compound motor/generator 30. The controller 42 can manipulate the compound motor/generator 30 to act either as a motor or a generator by applying the appropriate voltage or current via a power inverter 44. The inverter 44 regulates the flow of power between the battery 40 and the compound motor/generator 30, to convert between direct current power utilized by the battery 40 and alternating current power utilized by the compound motor/generator 30.

Compound motor/generator 30 is an example of a coaxial, flux-linked compound motor. A magnetic flux path extends through the stator 32 and both rotors 34, 36. The stator terminal voltage is the sum of the voltages for the two rotors 34, 36 plus an amount necessary to accommodate losses incurred in converting electrical power to mechanical power.

The transmission 18 establishes a mechanical power path by which power flows from the input member 16 to the output member 19. The mechanical power path includes and is defined by power flow from the input member 16, to the carrier member 26, the pinion gear 27, the ring gear member 24 and the output member 19. The mechanical power path established by these components carries a varying fraction of the power being transmitted between the input member 16 and the output member 19 as the speed ratio between these two members varies. When the motor/generator 30 is controlled such that the sun gear 22 is stationary, all of the power being transmitted from input member 16 to the output member 19 is being transmitted via the mechanical power path.

An electromechanical power path is also established by the transmission 18. The electromechanical power path includes and is defined by power flow from the input member 16, to the carrier member 26, to the pinion gear 27, to the sun gear member 22, to the second rotor 36, to the first rotor 34 and the output member 19. The differential gear set 20 splits the power transmitted by the transmission from the input member 16 into the fraction carried by the mechanical path and the remaining fraction which is carried by the electromechanical path, and the two fractions are brought back together by the action of the ring gear 24 and the first rotor 34 on the output member 19. This type of power split is referred to as an input-split transmission.

When controlled to operate as a hybrid electrically variable transmission, power is added to or taken from the output member 19 via the compound motor/generator 30. For instance, power may be supplied by the battery 40 through the stator 32 to increase the rotational speed of the rotors 34, 36, thereby increasing the speed of the output member 19. Alternatively, power may be supplied to the battery 40 by controlling the motor/generator 30 to act as a generator, transferring mechanical power from either or both rotors 34, 36 to electrical power in the stator 32, which is then directed to the battery 40. Additionally, power may be transferred from one rotor to the other. For instance, torque of the rotor 36, the outer rotor, may be transferred to increase rotational speed of the inner rotor 34 due to the flux linkage of the two rotors discussed above. By providing a direct link between the rotors 34, 36 only one inverter 44 is required.

In the claims, the ring gear member 24 is referred to as the first member of the differential gear set, the sun gear member 22 is referred to as the second member of the differential gear set and the carrier member 26 is referred to as the third member of the differential gear set.

Figure 2:
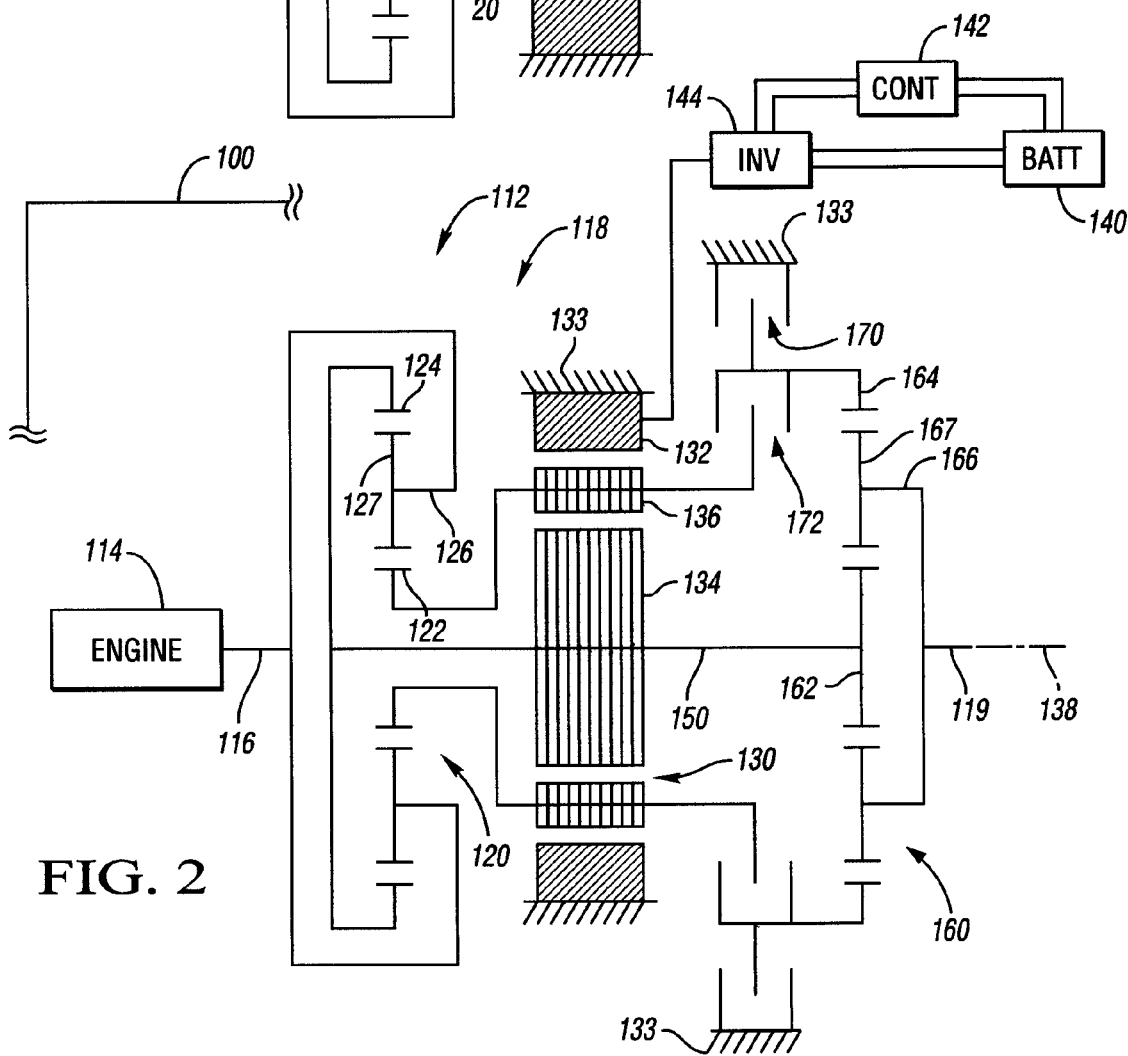
FIG. 2 is a schematic illustration of another embodiment of a vehicle having a powertrain with an electrically variable transmission using a compound motor/generator with coaxial rotors and two differential gear sets.

Referring to FIG. 2, a vehicle 100 includes a powertrain 112 having an engine 114 with an output member directly connected to drive an input member 116 of another embodiment of an electrically variable transmission 118. The transmission 118 establishes a fixed ratio and two electrically variable ranges of ratios between the input member 116 and output member 119.

The transmission 118 includes a first differential gear set, which is a planetary gear set 120. The planetary gear set 120 includes a sun gear member 122, a ring gear member 124, and a plurality of pinion members 127 rotatably supported on a carrier member 126 and in meshing engagement with both the sun gear member 122 and the ring gear member 124. The carrier member 126 is continuously connected for common rotation with the input member 116.

The electrically variable 118 further includes a compound electromagnetic motor/generator 130. The motor/generator 130 includes a single stator 132 grounded to a stationary member 133 as well a first rotor 134 and a second rotor 136 which are coaxially aligned and flux-linked by the single stator 132. The rotors 134, 136 are "flux-linked" meaning that a common flux path is created when electrical power is supplied to the stator 132 to apply a driving torque to both the rotors 134, 136. The first rotor 134 is connected for common rotation with the ring gear member 124. The second rotor 136 is connected for common rotation with the sun gear member 122.

The transmission 118 further includes a second differential gear set, which in this case is a planetary gear set 160. The planetary gear set 160 includes a sun gear member 162, a ring gear member 164 and a carrier member 166 that rotatably supports a plurality of pinion gears 167 in meshing engagement with both the sun gear member 162 and the ring gear member 164. The sun gear member 162 is connected for common rotation with an intermediate shaft 150 which connects the ring gear member 124, the first rotor 134 and the sun gear member 162. The carrier member 166 is connected for common rotation with the output member 119. The rotors 134, 136 are concentric and rotatable about a common axis 138 defined by the output member 119, the input member 116 and the intermediate shaft 150. In the claims, the ring gear member 124 is referred to as the first member of the first planetary gear set, the sun gear member 122 is referred to as the second member of the first planetary gear set, and the carrier member 126 is referred to as the third member o the first planetary gear set. Also in the claims, the sun gear member 162 is referred to as the first member of the second planetary gear set, the ring gear member 164 is referred to as the second member of the second planetary gear set, and the carrier member 166 is referred to as the third member of the second planetary gear set.

A battery 140 selectively supplies power to or receives power from the motor/generator 130 under the control of a controller 142. The controller 142 is in signal communication with the battery 140 and with the compound motor/generator 130. Additionally, the controller 142 may communicate with other vehicle electrical components (not shown), such as electrically power steering, electrical power braking systems, etc. The controller 142 may respond to a variety of input signals including vehicle speed, operator demand, the level to which the battery 140 is charged and the power being applied by the engine 114, to regulate the flow of power between the battery 140 and the compound motor/generator 130. The controller 142 can manipulate the compound motor/generator 130 to act as either a motor or a generator, by applying the appropriate voltage and current via a power inverter 144. The inverter 144 regulates both power between the battery 140 and the compound motor/generator 130, to convert between direct current power utilized by the battery 140 and alternating current power utilized by and/or generated by the compound motor/generator 130. The use of power inverters is readily understood by those skilled in the art.

A first torque-transmitting mechanism 170, which is a brake, is selectively engagable to ground the ring gear member 164 with the transmission housing 133. A second torque-transmitting mechanism 172 is selectively engagable to connect the second rotor 136 as well as the sun gear member 122 for common rotation with the ring gear member 164.

The transmission 118 may be utilized to start the engine 114 via power from the battery 140. To start the engine 114, neither of the torque-transmitting mechanisms 170, 172 are engaged. Power is provided from the battery 140 to the stator 132. The stator 132 produces torque in the same direction in both of the rotors 134, 136. Torque from both the rotors 134, 136 is added by the first planetary gear set 120 to provide torque at the input member 116 to start the engine 114. During engine starting, the output member 119 has no torque or speed. The second planetary gear set 160 spins freely. This same arrangement is provided during engine idling, i.e., both the torque-transmitting mechanisms 170, 172 remain disengaged.

A first mode of electrically-variable operation is provided by engaging the torque-transmitting mechanism 170 to ground the ring gear member 164 to the transmission housing 133 to prevent rotation of the ring gear 164. Power is provided to the stator 132 from the battery 140. In this first mode, the input member 116 spins forward rapidly with input torque provided from the engine 114. The first planetary gear set 120 spins the first rotor 134 forward. A magnetic field created by the electrical power flow in windings of the stator creates a common flux path among the stator 132, the rotor 134 and the rotor 136. The inner rotor 134 transfers torque to the second rotor 136, and the stator 132 may also transfer to second rotor 136 torque which is produced either with power from the battery or from the interaction between first rotor 134 and the stator 132. The second torque-transmitting mechanism 172 is not engaged. The second planetary gear set 160 multiplies torque from the ring gear member 124 and inner rotor 134 supplied along the intermediate shaft 150. The output member 119 thus spins forward slowly with output torque. In this first electrically variable mode, an electromechanical power path is provided through the following components; the input member 116, the carrier member 126, the pinion gears 127, the sun gear member 122, the second rotor 136, the first rotor 134, the intermediate shaft 150, the sun gear member 162, the pinion gear member 167, the carrier member 166, and the output member 119.

A second mode of electrically variable operation is provided by disengaging the torque-transmitting mechanism 170 and engaging the second torque-transmitting mechanism 172 to connect the sun gear member 122 and the outer rotor 136 for common rotation with the ring gear member 164. In this mode, power from the input member 116 flows through the carrier member 126 and pinion gears 127 and then splits, with a portion of the power flowing through the ring gear member 124 and the sun gear member 162, and a portion of the power flowing from the pinion gear 127 to the sun gear member 122 and to the ring gear member 164. The power delivered to the sun gear member 162 and the ring gear member 164 is combined through the pinion gears 167, is received by the carrier member 166, and is thereby delivered to the output member 119. Thus, power is split and then combined by differential gear sets 120, 160 at the input member 116 and at the output member 119. This type of transmission is referred to as a compound-split transmission. If both of the rotors 134, 136 are moving, the circumferentially moving magnetic flux created by the electromagnetic field of the stator 132 will create torque in one rotor, which may then be transferred to the other rotor.

A mechanical power path is provided through the transmission 118 via the input member 116, the carrier member 126, pinion gears 127, ring gear member 124, intermediate shaft 150, sun gear member 162, pinion gears 167, carrier member 166 and output member 119. When both torque-transmitting devices 170, 172 are engaged, the sun gear member 122 of the first planetary gear set 120 and the ring gear member 164 of the second planetary gear set 160 are held stationary establishing a fixed gear ratio mode of operation of the transmission 118. With these two gear members 122, 164 fixed, no power may be transmitted to or from the first rotor 134 and all of the power which flows through the transmission 118 from the input member 116 to the output member 119 bypasses the electromechanical power path and flows through the mechanical power path.

Fixed ratio operation may be used for continuous operation of the vehicle 100, or momentarily during a shift between one mode of electrically variable operation and the other mode of electrically variable operation. The torque-transmitting mechanisms 170, 172 which provide both modes of electrically variable operation can simultaneously be fully engaged to prevent relative rotation, while the transmission 118 is providing power from the input member 116 to the output member 119. Thus, a shift between modes of electrically variable operation may be accomplished in the transmission 118 as a speed-synchronous shift, wherein the relative rotation the torque-transmitting mechanisms 170, 172 may be essentially zero immediately before, during and after shifting.

Figure 3:
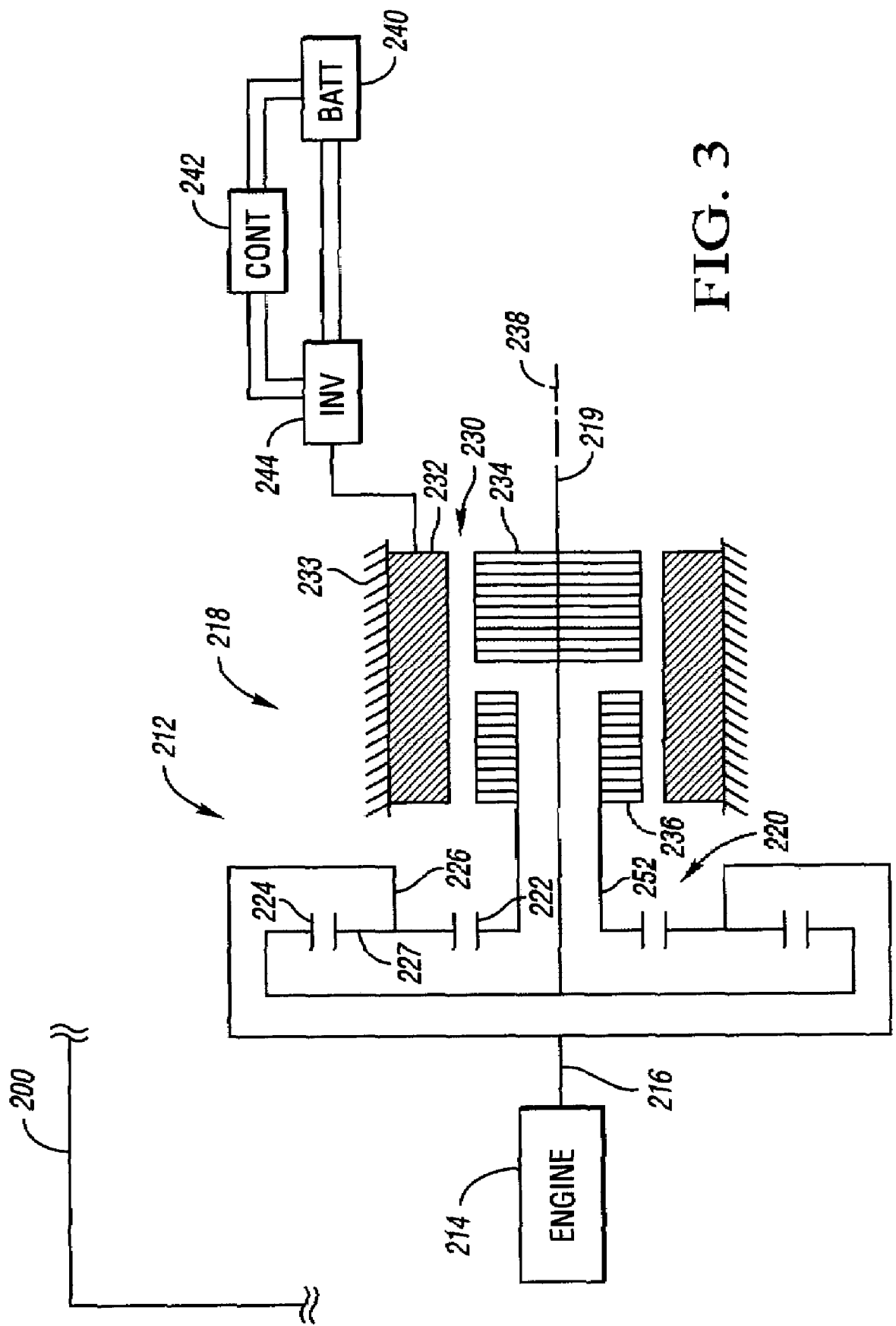
FIG. 3 is a schematic illustration of another embodiment of a vehicle having a powertrain with an electrically variable transmission using a compound motor/generator with adjacent, axially-spaced, axially-aligned rotors.

Referring to FIG. 3, another representative form of an electrically variable transmission having a compound motor/generator is depicted. The vehicle 200 utilizes a powertrain 212 having an engine 214 with an output member that directly drives an input member 216, of a transmission 218. The input member 216 may be in the nature of a shaft. A transmission output member 219, which may also be in the nature of a shaft, is operatively connected to vehicle wheels (not shown) such that the powertrain 212 drives the wheels. Optionally, a transient torque damper may be incorporated between the engine 214 and the input member 216, although this is not required. Additionally, a torque-transmitting mechanism may optionally be placed between the engine 214 and the input member 216 to permit selective engagement of the engine 214 with the transmission 218. In the embodiment depicted, the engine 214 may be a fossil fuel engine, such as a diesel engine or internal combustion engine.

The transmission 218 includes a differential gear set 220, which in this embodiment is a planetary gear set having a sun gear member 222, a ring gear member 224, and carrier member 226 that rotatably supports a plurality of pinion gears 227 that intermesh with both the sun gear member 222 and the ring gear member 224. The input member 216 is continuously connected with the carrier member 226 and the ring gear member 224 is continuously connected with the output member 219.

The transmission 218 further includes a compound electromagnetic motor/generator 230. The compound motor/generator 230 includes a single stator 232 rigidly connected with a stationary member 233 such as the transmission housing. The single stator 232 is controllable to transfer power between a first rotor 234 and a second rotor 236. The first and second rotors 234, 236 are axially adjacent one another and aligned such that the first rotor 234 rotates with the output member 219 and the second rotor 236, which is annular in nature, rotates about an axis 238 partially defined by the output member 219 and rotates commonly with the sun gear member 222 to which it is connected via a sleeve shaft 252.

In addition to receiving power from the engine 214, an energy storage device such as a battery 240 selectively receives power from or provides power to the compound electromagnetic motor/generator 230 under the control of a controller 242. The controller 242 is in signal communication with the battery 240 and in signal communication with the motor/generator 230. The controller 242 responds to a variety of input signals including vehicle speed, operator command, the level to which the battery 240 is charged and the power being applied by the engine 214, to regulate the flow of power between the battery 240 and the motor/generator 230. The controller 242 can manipulate the motor/generator 230 to act either as a motor or a generator by applying the appropriate voltage or current via a power inverter 244. The inverter 244 regulates the flow of power between the battery 240 and the motor/generator 230 to convert between direct current power utilized by the battery 240 and alternating current power utilized by the motor/generator 230.

The motor/generator 230 is an example of an axially-aligned, compound motor/generator with a common stator 232 that is linked to the first and second rotors 234, 236 by separate flux paths of different magnitudes such that the stator 234 can transfer power from the first rotor 234 to the second rotor 236 and vice versa. A first magnetic flux path extends through the stator 232 and the first rotor 234. A second magnetic flux path extends through the stator 232 and the second rotor 236.

The transmission 218 establishes a mechanical power path by which power flows from the input member 216, to the carrier member 226, the pinion gears 227, the ring gear member 224 and the output member 219. The mechanical power path established by these components carries a varying fraction of the power being transmitted between the input member 216 and the output member 219, as the speed ratio between these members varies. When the motor/generator 230 is controlled such that the speed of rotation of the sun gear 222 is zero, none of the power from the input member 216 to the output member 219 is being transmitted through the rotors 234, 236, and the fraction of the power being carried by the mechanical power path is equal to 100% of the total power being transmitted from the input member 216 to the output member 219.

An electromechanical power path is also established by the transmission 218. The electromechanical power path is defined by power flow from the input member 216, to the carrier member 226, to the pinion gears 227, to the sun gear member 222, to the second rotor 236, to the stator 233, to the first rotor 234, and the output member 219. The differential gear set 220 splits the power transmitted by the transmission from the input member 216 into the fraction carried by the mechanical path and the remaining fraction which is carried by the electromechanical path, and the two fractions are brought back together by the action of the ring gear 224 and the first rotor 234 on the output member.

When controlled to operate as a hybrid electrically variable transmission, power is added to or taken from the output member 219 via the motor/generator 230. For instance, power may be supplied by the battery 240 through the stator 232 to increase the rotational speed of the rotors 234, 236, thereby increasing the speed of the output member 219. Alternatively, power may be supplied to the battery 240 by controlling the motor/generator 230 to act as a generator, transferring mechanical power from either or both rotors 234, 236 to electrical power in the stator 232, which is then directed to the battery 240. Additionally, power may be transferred from one rotor to the other. For instance, rotational speed of the rotor 236 may be transferred to increase rotational speed of the rotor 234 by magnetic flux induced in the rotating second rotor 236 being converted to electrical power in the stator 232 that is then applied as magnetic flux to increase the rotational speed of the first rotor 234. By controlling the stator 232 such that is can operate as a direct link to transfer power between the rotors 234, 236, only one inverter 244 is required.

In the claims, the ring gear member 224 is referred to as the first member of the differential gear set, the sun gear member 222 is referred to as the second member and the carrier member 226 is referred to as the third member of the differential gear set.

Referring to FIG. 4, an example of a compound motor/generator 330 is illustrated having adjacent, axially-spaced and axially-aligned first and second rotors 334, 336 that are driven by common windings 337 in a single stator 332. The first rotor 334 is connected for common rotation with a shaft 350, which may be an output member of a transmission or may connect through a planetary gear set to an output member of the transmission. The second rotor 336 is connected for common rotation with a shaft 352, which may be a sleeve shaft that rotates concentrically about the shaft 350, or is not concentric with shaft 350 but is axially-aligned with shaft 350, and that connects to an input member or to an output member, preferably through a planetary gear set. Those skilled in the art will understand that there are numerous ways that the compound motor/generator 330 could be substituted for any of the other motor/generators in the powertrain embodiments disclosed herein to establish an electrically variable transmission.

The windings 337 extend the full length L of the stator 332. Each of the rotors 334, 336 has a length of one half that of the stator (i.e., L/2) and are enveloped by the stator 332 with the first rotor 334 being inserted within the stator 332 on the right and the second rotor being inserted within the stator 332 on the left. The motor/generator 330 may be referred to as a "winding-linked" motor/generator because the windings 337 in stator 332 establish two separate flux paths which may have different magnitudes. In fact, the different flux paths allow torque to be transferred from rotor 334 to rotor 336 or vice versa by one of several different methods, such as by currents in the windings. A plurality of copper bars 338 spaced about the circumference of each of the rotors 334, 336. Each flux path extends circumferentially about the stator in a given direction (clockwise or counterclockwise) a distance about the circumference depending on the portion of the windings energized, then extends radially-inward through laminations between the copper bars 338, then circumferentially along the respective rotor 334, 336 a distance determined by the number of copper bars enveloped by the energized windings 337, and then back outward through laminations between copper bars 338 to the energized set of windings 337. This establishes a flux path generally of the shape indicated with respect to the embodiment of FIGS. 6A and 7A. The flux path moves about the stator in the direction that the windings are energized as different groups of the windings 337 are energized, as will be readily understood by those skilled in the art. As current in the windings travels about the stator 332, current can be induced in the copper bars that are radially inward of those windings 337 that are energized at any given time if there is a difference in the rotational speed of the respective rotor 334, 336 and that of the moving flux path created by the stator windings 337. The induced current creates magnetic field acting about those copper bars 338. The magnitude of this magnetic field depends on the relative speed between the respective rotor 334, 336 and the stator 332. The induced magnetic field creates relative torque between the respective rotor 334, 336 and the stator 332. This relative torque can be transferred into electrical power in the windings 337 of the stator 332 and then transferred to the other stator as rotational torque. In this way, the motor/generator 330 can transfer power between the rotors 334, 336.

Referring to FIG. 5, an example of a compound motor/generator 430 is illustrated having coaxial first and second rotors 434, 436 that are driven by common windings 437 in a single stator 432. The first rotor 434 is connected for common rotation with a shaft 450, which may be an output member of a transmission or may connect through a planetary gear set to an output member of the transmission. The second rotor 436 is connected for common rotation with a shaft 452, which may be a sleeve shaft that rotates concentrically about the shaft 450, or is not concentric with shaft 450 but is axially aligned with shaft 450, and which connects to an input member, preferably through a planetary gear set. Those skilled in the art will understand that there are numerous ways that the compound motor/generator 430 could be substituted for any of the other motor/generators in the powertrain embodiments disclosed herein to establish an electrically variable transmission.

The windings 437 extend the full length L of the stator 432. Each of the rotors 434, 436 has a length L equal to that of the stator 432 and are enveloped by the stator 432 with the first rotor 434 being inserted within the stator 432 such that it is radially outward of and envelopes the second rotor 436. The motor/generator 430 may be referred to as a "flux-linked" motor/generator as the windings 437 in stator 432 establish a single flux path linking the rotors 434, 436. The flux path extends circumferentially about the stator 432 in a given direction (clockwise or counterclockwise) a distance about the circumference depending on the portion of the windings 437 energized and moves about the stator 432 in that direction as different groups of the windings 437 are energized, as will be readily understood by those skilled in the art. Each of the rotors 434, 436 has a plurality of copper bars 438 spaced about its circumference. As current in the windings travels about the stator, current can be induced in the copper bars 438 that are radially inward of those windings 437 that are energized at any given time if there is a difference in the rotational speed of the respective rotor 434, 436 and that of the moving flux path created by the stator windings 437. The induced current creates a magnetic field acting about those copper bars. The magnitude of this magnetic field depends on the relative speed between the rotor and the stator 432. The induced magnetic field creates relative torque between the rotor and the stator, and also contributes to the torque on the other rotor. In this way, the motor/generator 430 can transfer power between the rotors 434, 436.

Figure 6A:
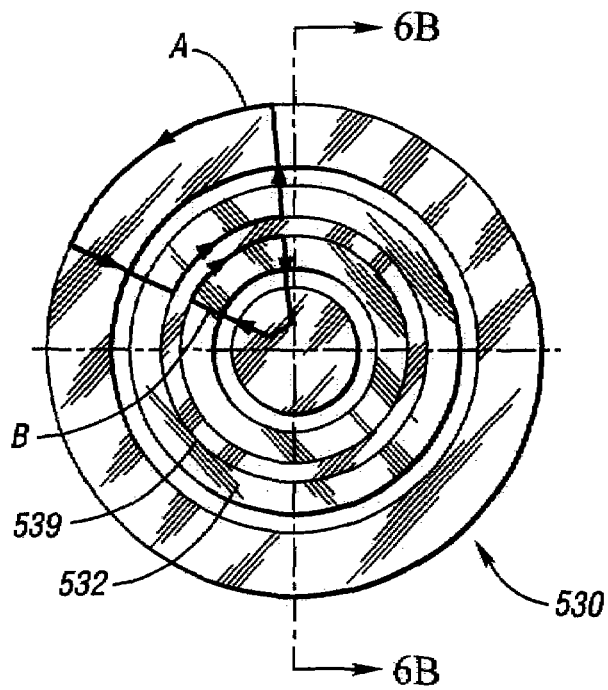
FIG. 6A is a schematic axial view of a compound motor/generator having coaxial rotors with a common stator therebetween and having two separate flux paths.
Figure 6B:
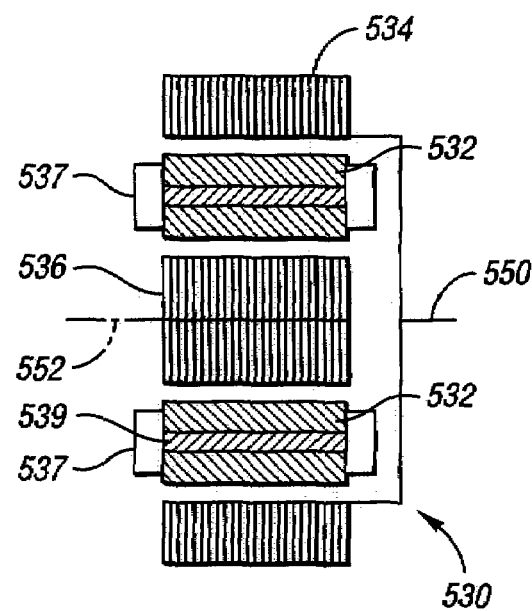
FIG. 6B is a schematic cross-sectional view of the motor/generator of FIG. 6A taken at the arrows indicated in FIG. 6A.

Referring to FIGS. 6A and 6B, an example of a compound motor/generator 530 is illustrated having coaxial first and second rotors 534, 536 that are driven by common windings 537 in a single stator 532 that is located radially between the two rotors 534, 536. The windings 537 are not shown in detail except to indicate that they link the radially inner and radially outer faces or the stator 532. The first rotor 534 is connected for common rotation with a shaft 550, which may be an output member of a transmission or may connect through a planetary gear set to an output member of the transmission. The second rotor 536 is connected for common rotation with a shaft 552, which may be a sleeve shaft that rotates concentrically about the shaft 550, or is not concentric with shaft 550 but is axially-aligned with shaft 550, and which connects to an input member, preferably through a planetary gear set. Those skilled in the art will understand that there are numerous ways that the compound motor/generator 530 could be substituted for any of the other motor/generators in the powertrain embodiments disclosed herein to establish an electrically variable transmission.

The stator 532 includes back iron 539 that separates the flux created by the windings at the inner and outer faces of the stator 532 so that two separate flux paths A and B move around the stator 532 in either the same direction (i.e., either clockwise or counterclockwise) or in opposite directions about the motor/generator 530, following the pattern of energized windings. If either rotor is rotating with a speed relative to the speed of these traveling flux paths, a torque will be induced between that rotor and the stator 532. Torque produced by one of the rotors 534 or 536 can be transmitted to the other rotor 536 or 534 through the common windings 537, so that this motor 530 may also be referred to as "winding-linked". That is, the torque of one rotor 534 may produce or modify currents in the windings 537 of the stator 532, and these currents may produce a torque on the other rotor 536.

Figure 7A:
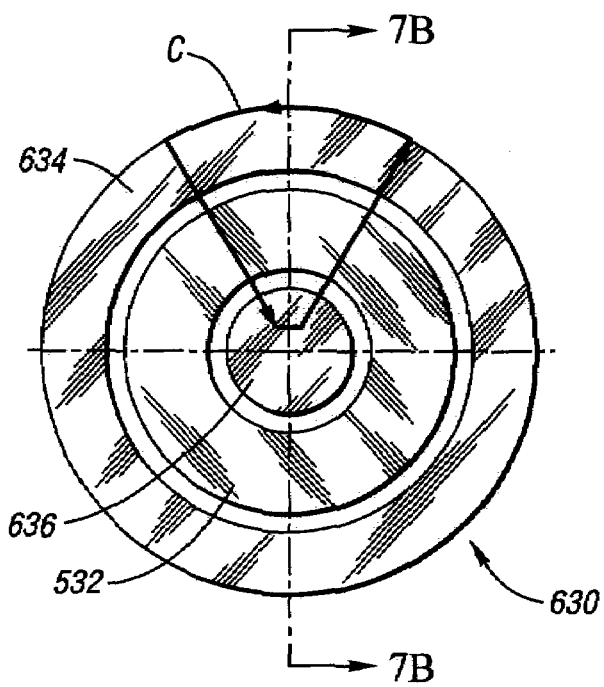
FIG. 7A is a schematic axial view of another embodiment of a compound motor/generator having coaxial rotors with a common stator therebetween and sharing a common flux path with the common stator.
Figure 7B:
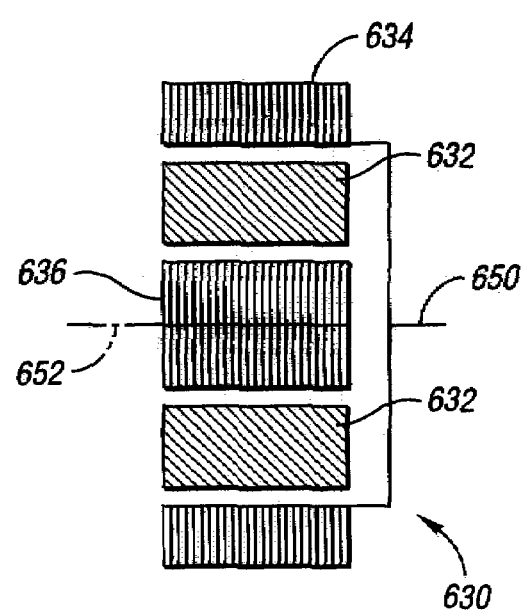
FIG. 7B is a schematic cross-sectional view of the motor/generator of FIG. 7A taken at the arrows indicated in FIG. 7A.

Referring to FIGS. 7A and 7B, an example of a compound motor/generator 630 is illustrated having coaxial first and second rotors 634, 636 that are driven by common windings in a single stator 632 which is radially between the two rotors. The windings are not shown in detail but extend through the stator 632 from one end to the other. The first rotor 634 is connected for common rotation with a shaft 650, which may be an output member of a transmission or may connect through a planetary gear set to an output member of the transmission. The second rotor 636 is connected for common rotation with a shaft 652, which may be a sleeve shaft that rotates concentrically about the shaft 650, or is not concentric with shaft 650 but is axially aligned with shaft 650, and which connects to an input member of a transmission, preferably through a planetary gear set. Those skilled in the art will understand that there are numerous ways that the compound motor/generator 630 could be substituted for any of the other motor/generators in the powertrain embodiments disclosed herein to establish an electrically variable transmission.

The stator 632 does not have back iron separating its inner and outer faces, and thus a common flux path C extends through the stator 632 and through both rotors 634, 636 as indicated in FIG. 7A and moves around the stator 632 in a direction (either clockwise or counterclockwise about the motor/generator 630 following the pattern of energized coils). If either rotor 634, 636 is rotating with a speed relative to the speed of the traveling flux path C, torque will be induced between that rotor and the stator 632, which may then be transferred to the other rotor via the stator 632.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle having an engine, comprising:
   an input member operatively connected to the engine for receiving power from the engine;
   an output member;
   a differential gear set having a first member, a second member and a third member and operatively connected between said input member and said output member; and
   a compound motor/generator having a single stator, a first rotor, and a second rotor; wherein said rotors are axially-spaced adjacent to one another for rotation about a common axis; wherein said first rotor is connected for common rotation with said output member and said second rotor rotates concentrically about said output member; wherein said single stator is operable to provide power to, receive power from and to transfer torque between said first and second rotors; and wherein said first and second rotors are operatively connectable to different ones of said members of said differential gear set such that the transmission is an electrically variable transmission having a mechanical power path and an electromechanical power path.

2. The transmission of claim 1, further comprising a plurality of torque-transmitting mechanisms; wherein said torque-transmitting mechanisms are selectively engagable to provide a plurality of electrically variable operating modes and at least one fixed gear ratio between said input member and said output member.

3. The transmission of claim 1, wherein the transmission is configured as an input-split transmission.

4. The transmission of claim 1, further comprising:
   a battery; and
   a single inverter operatively connecting said battery to said stator for transferring power between said battery and said stator; wherein said transmission is characterized by an absence of any additional inverters connected to said stator.

5. The transmission of claim 1, wherein said compound motor/generator is winding-linked.

6. The transmission of claim 1, wherein torque transfer between said first and second rotors is at least partially due to magnetic flux induced in one of said rotors.

7. The transmission of claim 1, wherein said single stator has windings configured to establish separate flux paths in said rotors.

8. A transmission for a vehicle having an engine, comprising:
   an input member operatively connected to the engine for receiving power from the engine;
   an output member;
   a differential gear set having a first member, a second member and a third member and operatively connected between said input member and said output member;
   a compound motor/generator having a single stator, a first rotor, and a second rotor, wherein said single stator is operable to provide power to, receive power from and to transfer torque between said first and second rotors; wherein said first and second rotors are operatively connectable to different ones of said members of said differential gear set such that the transmission is an electrically variable transmission having a mechanical power path and an electromechanical power path;
   wherein said differential gear set is a first differential gear set with said first member connected for common rotation with said first rotor, said second member connected for common rotation with said second rotor, and said third member connected for common rotation with said input member;
   a second differential gear set connected between said compound motor/generator and said output member and having a first, a second and a third member; wherein said first member of said second differential gear set is connected for common rotation with said first rotor; wherein said third member of said second differential gear set is connected for common rotation with said output member;
   a first torque-transmitting mechanism selectively engagable to ground said second member of said second differential gear set with a stationary member to establish an input-split power flow between said input member and said output member; and
   a second torque-transmitting mechanism selectively engagable to connect said second rotor for common rotation with said second member of said second differential gear set to establish a compound-split power flow between said input member and said output member.

9. The transmission of claim 8, wherein the transmission is configured as a compound-split transmission.

10. The transmission of claim 8, wherein said rotors are coaxial.

11. The transmission of claim 10, wherein said rotors are enveloped by said single stator.

12. The transmission of claim 8, wherein said compound motor/generator is flux-linked.

13. The transmission of claim 8, wherein said stator is configured to establish a shared flux path for said first and second rotors.

14. The transmission of claim 8, further comprising a plurality of torque-transmitting mechanisms; wherein said torque-transmitting mechanisms are selectively engagable to provide a plurality of electrically variable operating modes and at least one fixed gear ratio between said input member and said output member.

15. A transmission comprising:
   an input member;
   an output member;
   a compound electromagnetic motor/generator having a single stator operable for transferring power between a first rotor and a second rotor; wherein said stator and said first and second rotors are configured such that said first and second rotors are concentric and are enveloped by said single stator to establish a flux path shared by the rotors;
   a simple planetary gear set operatively connectable to said rotors; and
   wherein said simple planetary gear set and compound electromagnetic motor/generator establish both a mechanical power path and an electromechanical power path between said input member and said output member.

16. The transmission of claim 15, wherein said simple planetary gear set establishes an input-split power flow through the transmission.

17. The transmission of claim 15, further comprising:
   a second planetary gear set connecting said compound electromagnetic motor/generator with said output member to establish a compound-split power flow through the transmission.

* * * * *